(12) United States Patent
Inuzuka et al.

(10) Patent No.: US 7,611,086 B2
(45) Date of Patent: Nov. 3, 2009

(54) SEATBELT RETRACTOR AND SEATBELT DEVICE

(75) Inventors: Koji Inuzuka, Shiga (JP); Koji Tanaka, Moriyama (JP)

(73) Assignee: Takata Corporation, Tokyo (JP)

( * ) Notice: Subject to any disclaimer, the term of this patent is extended or adjusted under 35 U.S.C. 154(b) by 982 days.

(21) Appl. No.: 10/854,309

(22) Filed: May 27, 2004

(65) Prior Publication Data
US 2005/0061904 A1    Mar. 24, 2005

(30) Foreign Application Priority Data
Sep. 19, 2003    (JP) .............................. 2003-328044

(51) Int. Cl.
*B65H 75/48*    (2006.01)
(52) U.S. Cl. .................. 242/379.1; 242/390.8
(58) Field of Classification Search .............. 242/379.1, 242/390.8
See application file for complete search history.

(56) References Cited

U.S. PATENT DOCUMENTS

| | | | | |
|---|---|---|---|---|
| 5,087,075 | A * | 2/1992 | Hamaue | ...................... 280/806 |
| 5,526,996 | A | 6/1996 | Ebner et al. | |
| 6,513,747 | B1 * | 2/2003 | Lee et al. | ..................... 242/374 |
| 6,626,463 | B1 | 9/2003 | Arima et al. | |
| 6,910,653 | B2 * | 6/2005 | Tanji | ....................... 242/390.8 |
| 2003/0122020 | A1 | 7/2003 | Tanji | |

FOREIGN PATENT DOCUMENTS

| | | |
|---|---|---|
| EP | 1 108 627 | 6/2001 |
| JP | 2001-163179 | 6/2001 |
| JP | 2001-171485 | 6/2001 |
| JP | 2002-274324 | 9/2002 |
| JP | 2003-500273 | 1/2003 |
| JP | 2003-507252 | 2/2003 |
| WO | 00/71394 | 11/2000 |

\* cited by examiner

*Primary Examiner*—Sang Kim
(74) *Attorney, Agent, or Firm*—Manabu Kanesaka

(57) ABSTRACT

A seatbelt retractor includes a spool for winding a seatbelt; a locking mechanism having a locking member rotatable together with the spool in a normal condition and being prevented from rotating in a seatbelt-withdrawing direction in an emergency condition; an energy-absorbing mechanism interposed between the spool and the locking member for absorbing shock energy exerted on a passenger when the spool rotates in the seatbelt-withdrawing direction relative to the locking member in the emergency condition; and a motor for generating power to rotate the spool. A power transmission mechanism is connected to the locking member for transmitting the power of the motor to the spool through the power transmission mechanism, the locking member, and the energy-absorbing mechanism.

9 Claims, 9 Drawing Sheets

SEATBELT RETRACTOR AND SEATBELT DEVICE

BACKGROUND OF THE INVENTION AND RELATED ART STATEMENT

The present invention relates to a seatbelt retractor for retracting a seatbelt to constrain and protect a passenger in a vehicle such as an automobile. More specifically, the present invention relates to a seatbelt retractor capable of controlling a belt tension of the seatbelt by rotating a spool with a motor power and having an energy-absorbing mechanism (hereinafter, also referred to as EA mechanism) for absorbing shock energy exerting on a passenger caused by the seatbelt when the seatbelt is prevented from being withdrawn in a case, for example, where a car undergoes large deceleration due to a crash or the like. The present invention also relates to a seatbelt device provided with the seatbelt retractor.

A seatbelt apparatus attached to a seat in a vehicle such as an automobile includes a seatbelt retractor for retracting a seatbelt on a spool. As such a retractor, a variety of emergency locking retractors (hereinafter, also referred to as ELRs) have been developed. In case of emergency when large deceleration of a car occurs due to a car crash or the like, the ELR detects the deceleration, and a locking mechanism prevents the spool from rotating in the belt-withdrawing direction. Accordingly, the seatbelt is prevented from withdrawal caused by a passenger moving forward due to inertia, so that the ELR more reliably constrains and protects the passenger.

In such an ELR, when the locking mechanism prevents the spool from rotating in the belt-withdrawing direction so that the seatbelt constrains and protects the passenger, the passenger receives a large shock from the seatbelt. Although the shock does not cause a serious problem against the passenger, it is desirable to absorb the energy of the shock so as to limit an impulsive force.

An ELR in which an energy-absorbing mechanism (EA mechanism) is disposed to absorb the shock energy and limit a load exerted on the seatbelt in the event of the foregoing emergency in a seatbelt-wearing state has been developed. A seatbelt retractor including the EA mechanism and having a torsion bar interposed between a spool and a locking mechanism has been proposed (refer to Japanese Patent Publication (Kokai) No. 07-47923). In the seatbelt retractor disclosed in Japanese Patent Publication (Kokai) No. 07-47923, one end of the torsion bar is fixed to the spool so as to be rotatable together with the spool, and the other end of the torsion bar is fixed to a pawl-supporting member (hereinafter, referred to as locking base) supporting a pawl of the locking mechanism so as to be rotatable together with the pawl member. In the event of the foregoing emergency, the pawl of the locking mechanism engages a frame so as to prevent the locking base from rotating in the belt-withdrawing direction. Since the spool rotates in the belt-withdrawing direction due to inertia of the passenger, the torsion bar is deformed, and the foregoing shock energy is thus absorbed.

A motor-driven ELR in which a seatbelt is retracted by rotating a spool with a power of a motor has been proposed (refer to Japanese Patent Publication (Kokai) No. 2000-95064). Since the ELR disclosed in Japanese Patent Publication (Kokai) No. 2000-95064 controls a tension of the seatbelt by retracting the seatbelt with the motor, a passenger is appropriately constrained by the seatbelt in accordance with a car-running situation and so forth.

A seatbelt retractor in which the motor-driven ELR is applied to an ELR including the foregoing torsion bar has been proposed (refer to Japanese Patent Publication (Kokai) No. 2000-95064). In the ELR disclosed in Japanese Patent Publication (Kokai) No. 2000-95064, when there is a risk of a car crash, tension of a seatbelt is increased by driving a motor before activation of a locking mechanism of the ELR so as to constrain a passenger, and then, when the locking mechanism is activated, the torsion bar is deformed as described above so as to absorb the shock energy. With this structure, in case of emergency, the passenger can be effectively constrained and protected without suffering a large shock.

In the seatbelt retractor disclosed in Japanese Patent Publication (Kokai) No. 2000-95064, the motor is directly connected to the spool through a power transmission system. After the locking mechanism is activated, when the spool rotates in the belt-withdrawing direction and the torsion bar is deformed, the spool receives a certain amount of resistance from the motor and the power transmission system. The shock energy transmitted to the torsion bar is somewhat reduced by an amount corresponding to the resistance. The reduction does not particularly deteriorate a shock absorbing effect of the torsion bar, thereby achieving a satisfactory shock absorbing effect. Nevertheless, it is desirable to reduce such a resistance as small as possible so as to achieve a more satisfactory shock absorbing effect.

In view of the problems described above, the present invention has been made, and an object of the present invention is to provide a seatbelt retractor in which the shock energy is more effectively absorbed by a torsion bar included in a motor-driven ELR.

Further objects and advantages of the invention will be apparent from the following description of the invention.

SUMMARY OF THE INVENTION

In order to achieve the objects described above, according to a first aspect of the invention, a seatbelt retractor includes at least a spool for retracting a seatbelt; a locking mechanism having a locking member rotating together with the spool in a normal condition and being prevented from rotating in a seatbelt-withdrawing direction in an emergency condition; an energy-absorbing mechanism interposed between the spool and the locking member for absorbing shock energy exerted on a passenger when the spool rotates in the seatbelt-withdrawing direction relative to the locking member in the emergency condition; a motor for generating power to rotate the spool; and a power transmission mechanism for transmitting the power of the motor to the spool. The power transmission mechanism is connected to the locking member, and the power of the motor is transmitted to the spool through the power transmission mechanism, the locking member, and the energy-absorbing mechanism.

According to a second aspect of the invention, the energy-absorbing mechanism is formed of a torsion bar connecting the spool and the locking member and being deformed when the spool rotates relative to the locking member.

According to a third aspect of the invention, the power transmission mechanism has a torque limiter mechanism disposed therein for preventing a load torque greater than a predetermined value from being transmitted to the motor.

According to a fourth aspect of the invention, the torque limiter mechanism is formed of a clutch for shutting off the power transmitted to the power transmission mechanism when a load torque greater than the predetermined set value is transmitted to the power transmission mechanism.

According to a fifth aspect of the present invention, a seatbelt device includes the seatbelt retractor described above, a seatbelt, a tongue for passing the seatbelt, and a buckle for engaging the tongue.

In the seatbelt retractors having the structures as described above according to the first to fourth aspects, the power transmission mechanism is connected to the locking member so as to transmit the power of the motor to the spool through the power transmission mechanism, the locking member, and the energy-absorbing mechanism. Accordingly, the spool rotates without receiving a resistance from the motor and the power transmission mechanism. As a result, the shock energy can be easily transmitted to the energy-absorbing mechanism, thereby effectively activating the energy-absorbing mechanism. With this structure, the shock energy exerted on a passenger can be effectively absorbed and lessened.

Also, the motor and the power transmission mechanism are disposed close to the locking mechanism of the EA mechanism, thereby increasing the versatility of possible layout features and design features of the retractor, including a design feature of a known retractor in which the motor and the power transmission mechanism are disposed close to the spool of the EA mechanism. Especially, according to the second aspect of the invention, the EA mechanism is formed of the torsion bar, thereby making the structure of the EA mechanism simple.

In the third and four aspects of the inventions, the torque limiter mechanism is provided. Accordingly, when the electric motor is driven for retracting the belt, if a load torque greater than a set value is transmitted to the power transmission mechanism due to the belt tension of the seatbelt caused by deceleration in a light car crash or the like, the torque limiter mechanism prevents the load torque from being exerted on the power transmission mechanism. As a result, components such as gears of the power transmission mechanism are not required to have high tolerable strengths. In addition, a load torque exerted on the electric motor can be limited.

In the fourth aspect of the invention, the torque limiter mechanism is formed of the clutch, thereby making the structure of the torque limiter mechanism simple.

BRIEF DESCRIPTION OF THE DRAWINGS

FIGS. 4(a) and 4(b) are views showing a locking base of the seatbelt retractor shown in FIG. 1, wherein FIG. 4(a) is a perspective view thereof seen from a locking gear, and FIG. 4(b) is a perspective view thereof seen from a direction 4(b) in FIG. 4(a);

FIGS. 7(a) and 7(b) are views showing a connecting gear of the seatbelt retractor shown in FIG. 1, wherein FIG. 7(a) is a perspective view thereof seen from a casing of the motor-driving unit, and FIG. 7(b) is a perspective view thereof seen from a direction 7(b) in FIG. 7(a);

FIGS. 8(a) to 8(c) are views showing a torque limiter mechanism of the seatbelt retractor shown in FIG. 1, wherein FIG. 8(a) is an exploded perspective view, FIG. 8(b) is a schematic view showing a state in which power of the torque limiter mechanism is transmitted, and FIG. 8(c) is a schematic view showing a state in which the power of the torque limiter mechanism is shut off.

DETAILED DESCRIPTION OF PREFERRED EMBODIMENTS

Figure 1:
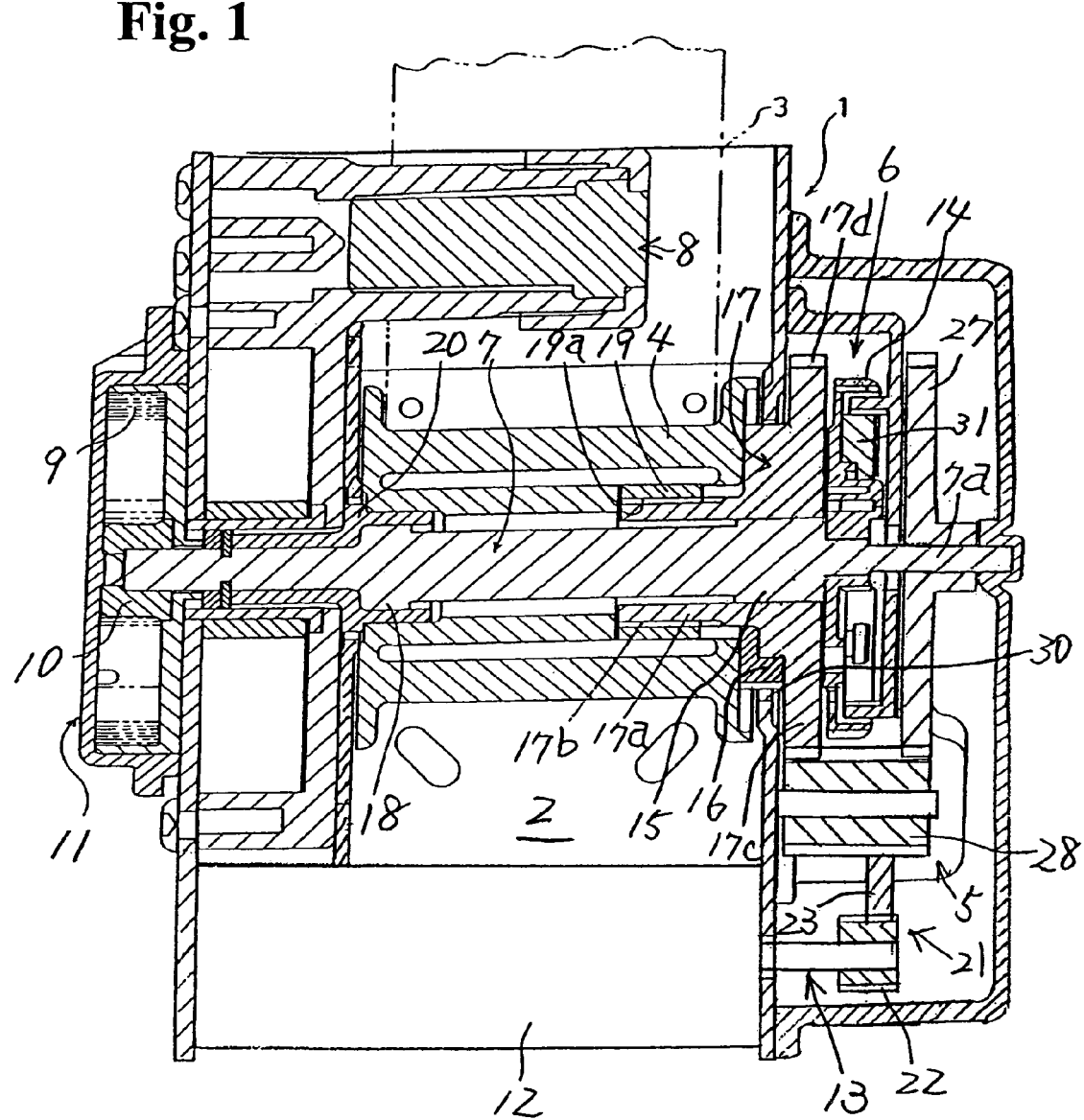
FIG. 1 is a schematic sectional view of a seatbelt retractor according to an embodiment of the present invention.
Figure 2:
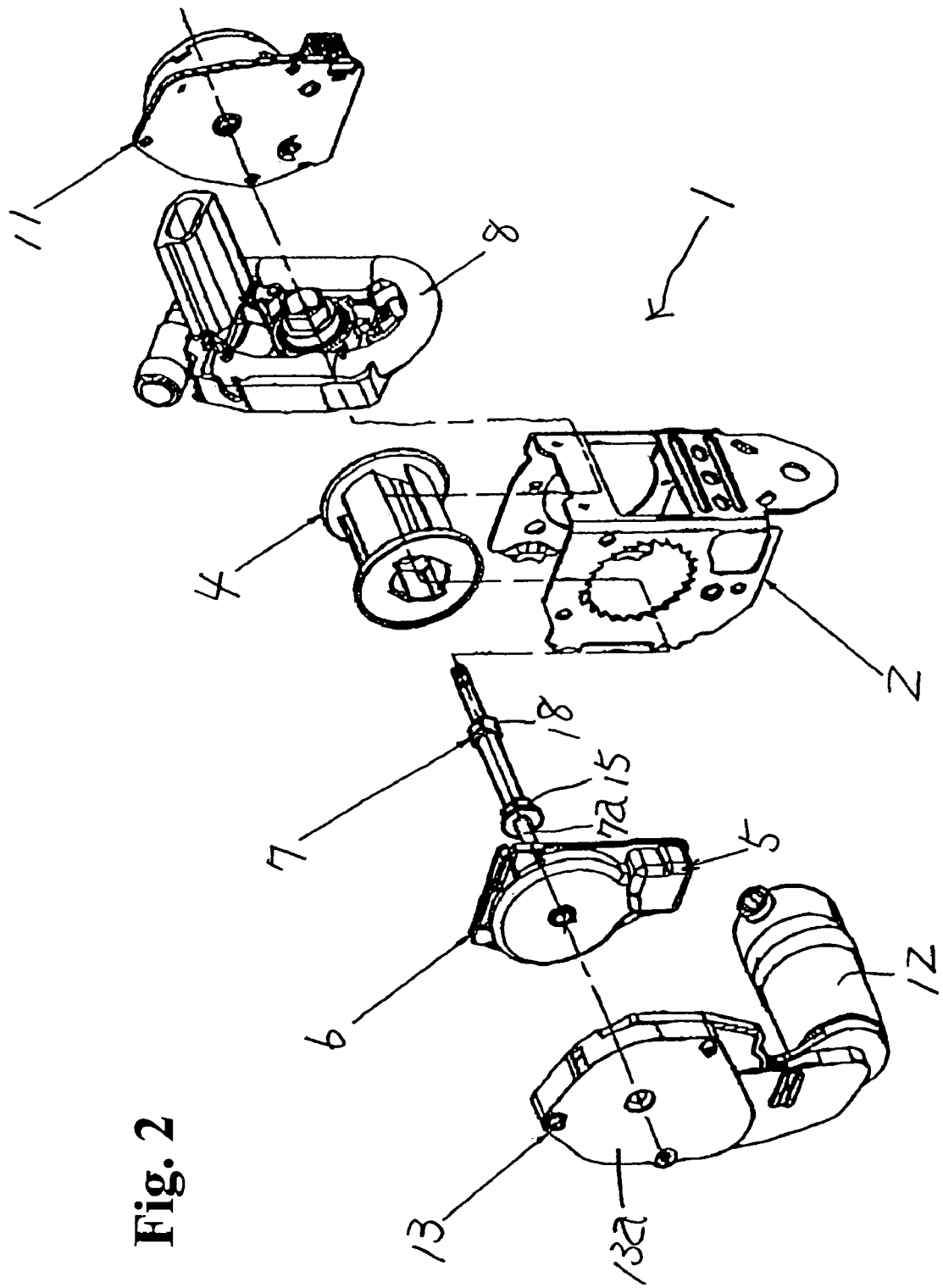
FIG. 2 is an exploded perspective view showing the seatbelt retractor shown in FIG. 1.
Figure 3:
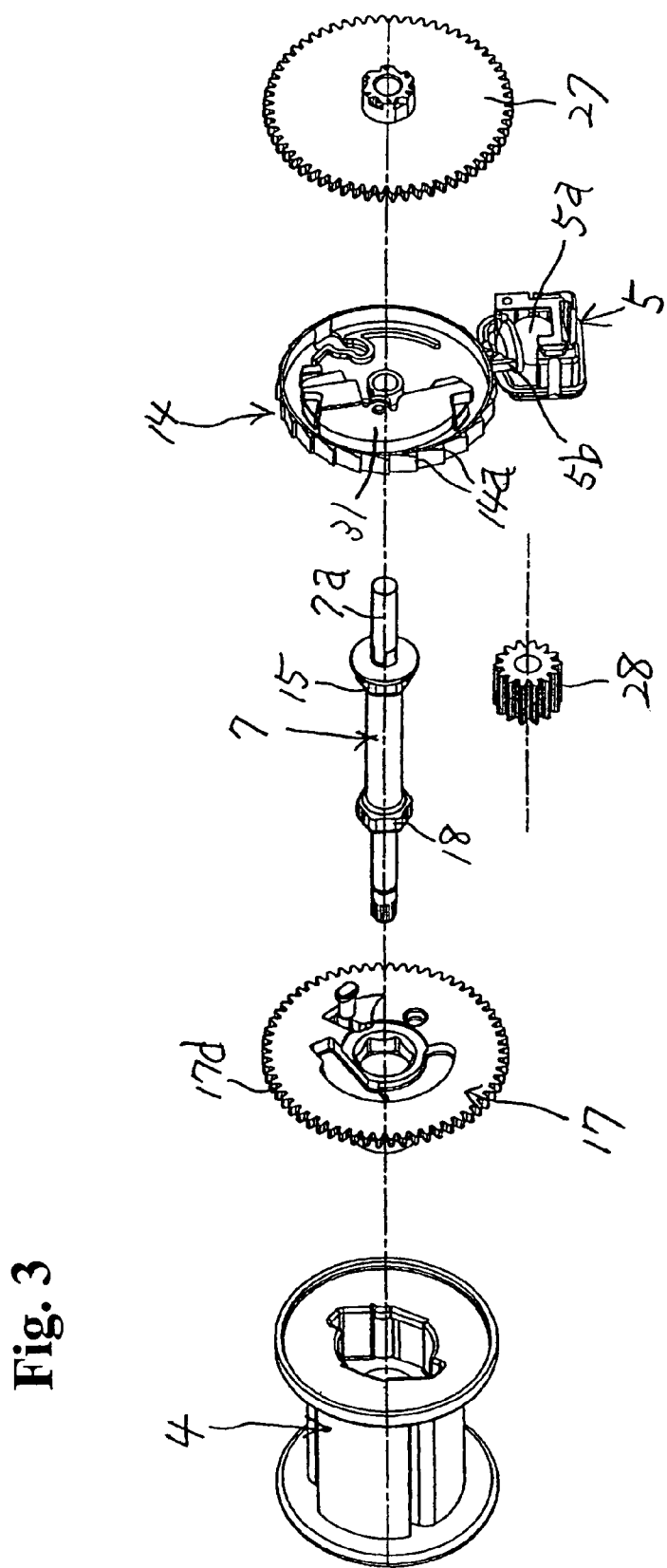
FIG. 3 is an exploded perspective view showing a part of the seatbelt retractor shown in FIG. 1.

Hereunder, embodiments of the present invention will be described below with reference to the drawings. FIG. 1 is a schematic sectional view of a seatbelt retractor according to an embodiment of the present invention. FIG. 2 is an exploded perspective view showing the seatbelt retractor shown in FIG. 1. FIG. 3 is an exploded perspective view showing a part of the seatbelt retractor shown in FIG. 1.

As shown in FIGS. 1 to 3, a seatbelt retractor 1 is an ELR and is mainly formed of a C-shaped frame 2; a seatbelt 3; a spool 4 rotatably supported between sidewalls of the C-shaped frame 2 for retracting the seatbelt 3; deceleration-sensing means 5 to be activated upon sensing large car deceleration in case of emergency; a locking mechanism 6 to be activated by the deceleration-sensing means 5 for preventing at least the spool 4 from rotating in a belt-withdrawing direction; a torsion bar 7 loosely fit into the center of the spool 4 in the axial direction thereof for rotatably connecting the spool 4 and the locking mechanism 6; a pretensioner 8 for applying a belt-retracting torque to the spool 4 by means of reactive gas generated in case of emergency; a spring unit 11 for urging the spool 4 in the belt-retracting direction with the spring force of a spiral spring 9 through a bushing 10; and a motor-driving unit 13 for applying the power of an electric motor 12 to the spool 4.

Figure 6:
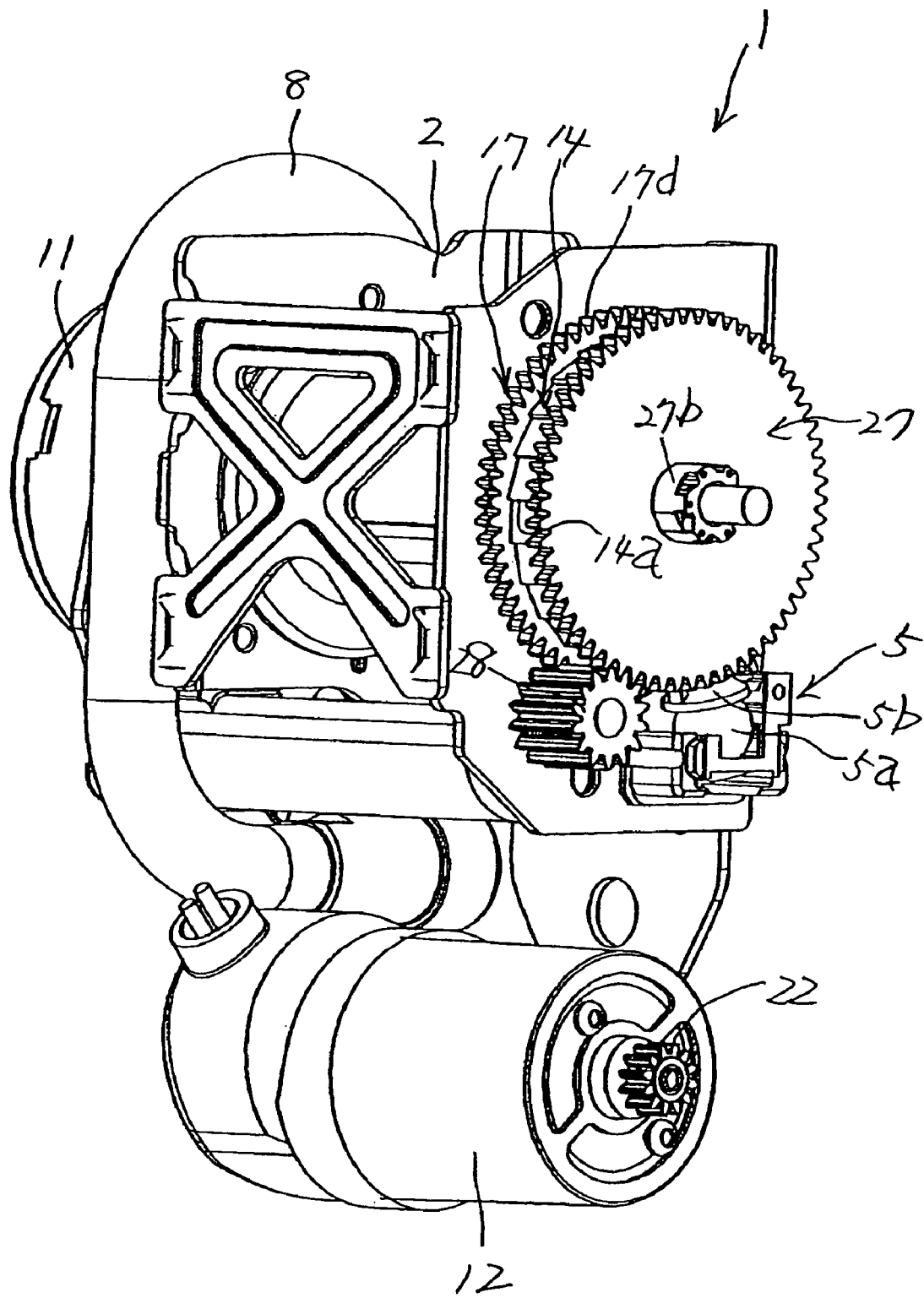
FIG. 6 is a perspective view of the seatbelt retractor shown in FIG. 1 in a state in which all gears of a power transmission mechanism are removed.

As shown in FIGS. 3 and 6, the deceleration-sensing means 5 is a conventionally known component, and formed of an inertia ball 5a to be activated in accordance with car deceleration in case of emergency and a retaining catch 5b to be activated with the activation of the inertia ball 5a. The detailed description thereof is omitted.

The locking mechanism 6 includes a locking gear 14 rotatably supported on a right end 7a of the torsion bar 7 and protruding rightward from the sidewall of the frame 2 as shown in FIG. 1 so as to be relatively rotatable with respect to the torsion bar 7; and a locking base (locking member) 17 supported on a first torque-transmitting portion 15 so as to be rotatable together with the first torque-transmitting portion 15 (described later) for rotatably holding a pawl 16. The locking gear 14 has ratchet teeth 14a formed along the outer circumference thereof. In a normal condition, the locking gear 14 rotates together with the torsion bar 7. In case of emergency (emergency condition), the inertia ball 5a of the deceleration-sensing means 5 is activated, so that the retaining catch 5b engages the ratchet teeth 14a, thereby preventing the locking gear 14 from rotating in the belt-withdrawing direction.

Figures 4A, 4B:
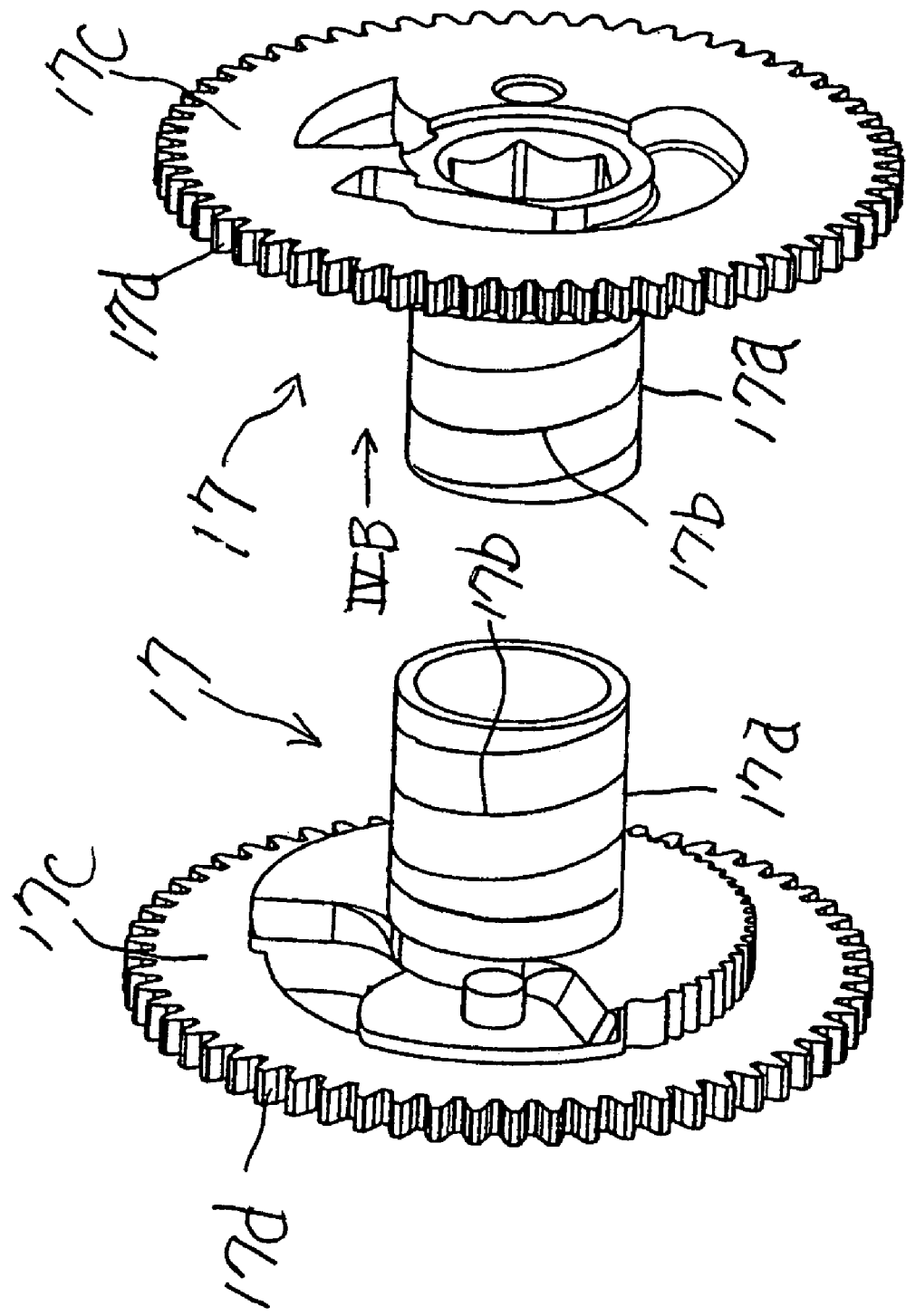

As shown in FIGS. 4(a) and 4(b), the locking base 17 has a cylindrical shaft portion 17a, and the shaft portion 17a has a male thread 17b formed thereon. In addition, the shaft portion 17a has a circular disk-shaped flange portion 17c integrally formed with one end thereof, and the flange portion 17c has external teeth 17d formed along the outer circumference thereof.

The torsion bar 7 has the first torque-transmitting portion 15 for engaging the locking base 17 so as not to be relatively rotatable and a second torque-transmitting portion 18 spaced away from the first torque-transmitting portion 15 by a predetermined spacing for engaging the spool 4 so as not to be relatively rotatable. In addition, a circular relative-rotation locking member 19 is interposed between the spool 4 and the shaft portion 17a of the locking base 17. The relative-rotation locking member 19 has a female thread 19a formed on the inner circumferential surface thereof so as to screw together with the male thread 17b formed on the shaft portion 17a of the locking base 17, and is fitted into an axial hole of the spool 4 so as not to be relatively rotatable and so as to be axially movable. When the spool 4 rotates in the belt-withdrawing direction relative to the locking base 17, the relative-rotation locking member 19 rotates together with the spool 4 and moves axially relative to the spool 4 and the locking base 17 in the rightward direction in FIG. 1.

The pretensioner 8 is a conventionally known component. When the pretensioner 8 is activated at an early stage of the emergency and generates reactive gas, a belt-retracting torque generated in response to the reactive gas is transmitted to the spool 4 through a bushing 20, so that the spool 4 retracts the seatbelt 3 by a predetermined amount in the early stage of the emergency.

Figure 5:
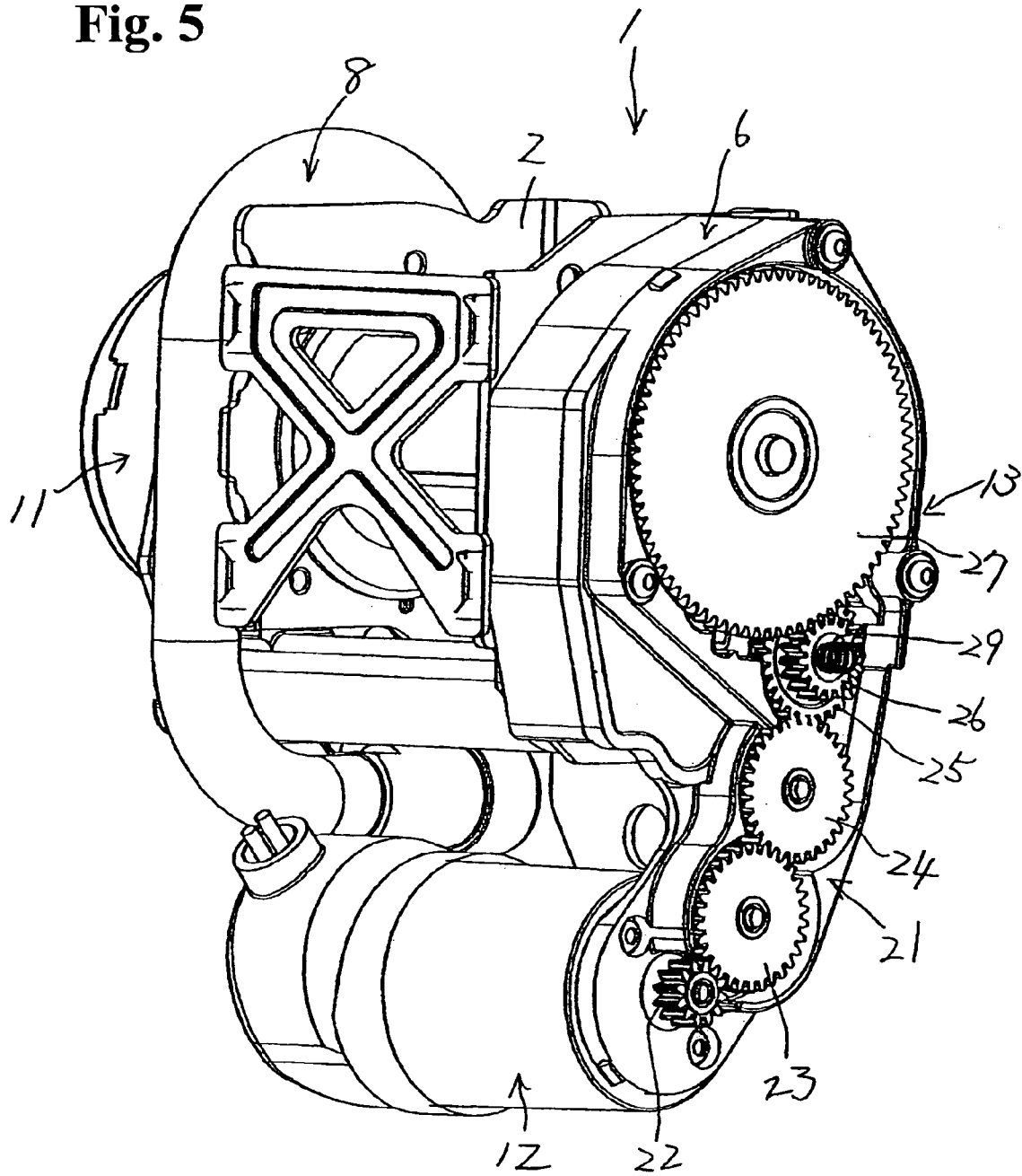
FIG. 5 is a perspective view of the seatbelt retractor shown in FIG. 1 in a state in which a casing of a motor-driving unit is removed.

As shown in FIGS. 5 and 6, the motor-driving unit 13 includes a power transmission mechanism 21 for transmitting the power of the motor 12 to the locking base 17 in a decelerated mode. The power transmission mechanism 21 is formed of a motor gear 22 having a small diameter and fixed to the rotating shaft of the electric motor 12 so as to be rotatable together with the same; a first idle gear 23 engaging the motor gear 22 and having a larger diameter than that of the motor gear 22; a second idle gear 24 engaging the first idle gear 23 and having the same diameter as that of the first idle gear 23; a first limiter gear 25 engaging the second idle gear 24; a second limiter gear 26 disposed coaxially with the first limiter gear 25 and having a smaller diameter than that of the first limiter gear 25; a connecting gear 27 engaging the second limiter gear 26, having a larger diameter than that of the motor gear 22 and the same diameter as that of the external teeth 17d of the locking base 17, and supported on the right end 7a of the torsion bar 7 so as to be relatively rotatable with respect to the same; and a pinion gear 28 engaging both connecting gear 27 and external teeth 17d of the locking base 17 and having a smaller diameter than those of the connecting gear 27 and the external gear 17d.

Figures 7A, 7B:
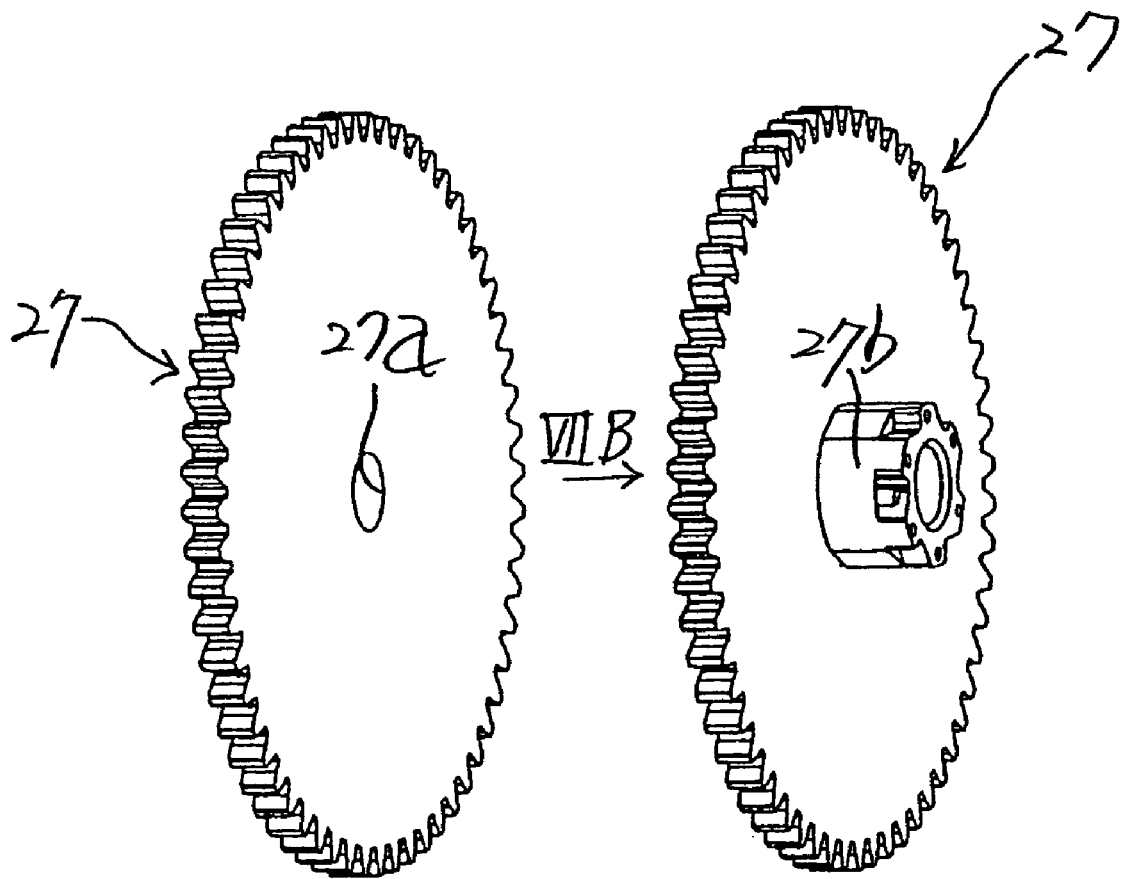

As shown in FIGS. 7(a) and 7(b), the connecting gear 27 is formed in a disk shape having a perforation 27a at the center thereof through which the right end 7a of the torsion bar 7 extends and a bushing 27b aligned with the perforation 27a so as to protrude axially from the central part thereof.

Figure 8A:
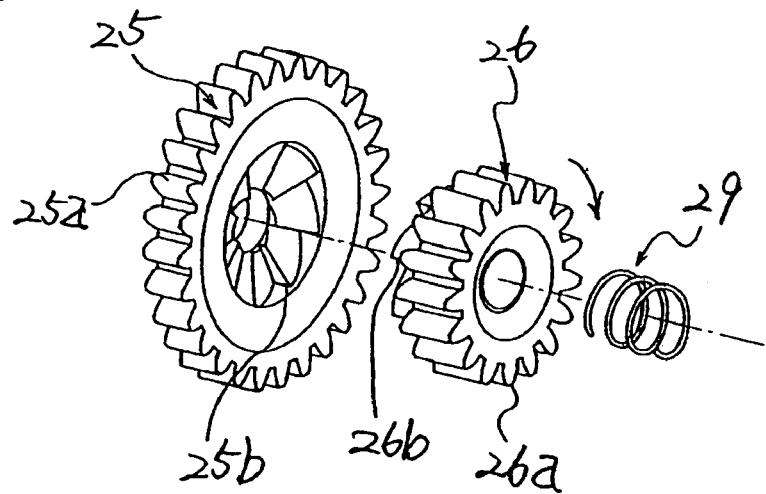
Figure 8B:
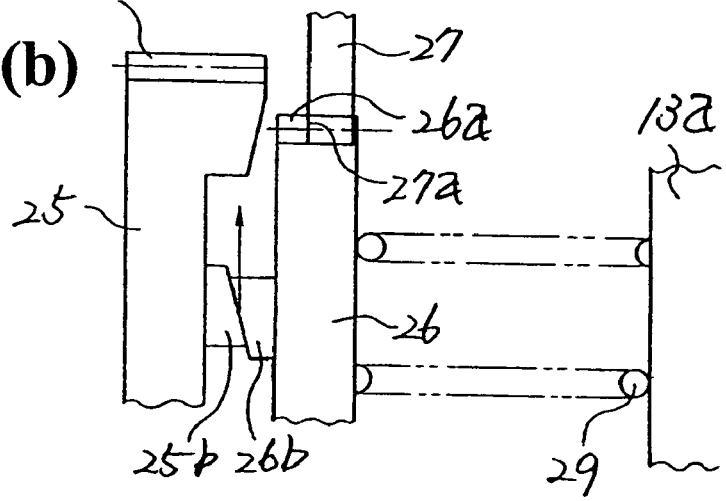
Figure 8C:
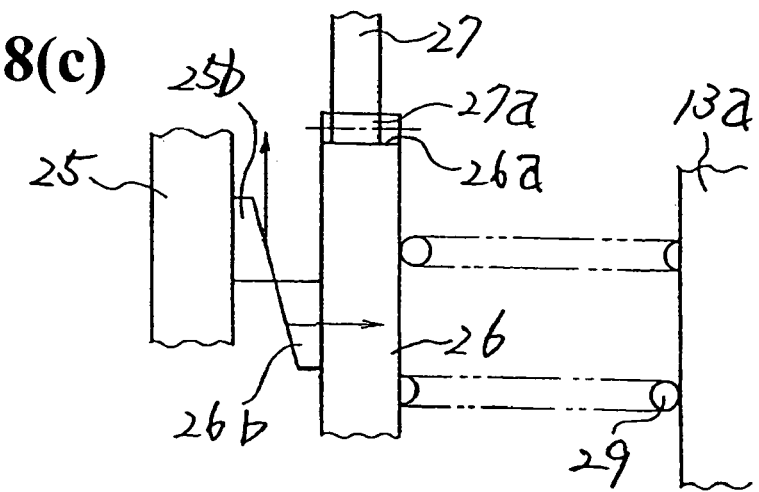

FIGS. 8(a) to 8(c) are views showing a torque limiter mechanism of the seatbelt retractor shown in FIG. 1, wherein FIG. 8(a) is an exploded perspective view thereof, FIG. 8(b) is a schematic view showing a state in which power of the torque limiter mechanism is transmitted, and FIG. 8(c) is a schematic view showing a state in which the power of the torque limiter mechanism is shut off.

As shown in FIG. 8(a), the first and second limiter gears 25 and 26 are disposed so as to be relatively rotatable with respect to each other, and the second limiter gear 26 is disposed so as to be axially movable to contact or separate from the first limiter gear 25. The first limiter gear 25 has external teeth 25a formed along the outer circumference thereof for engaging the second idle gear 24, and has ratchet teeth 25b formed at the central part thereof close to the motor. Also, the second limiter gear 26 has external teeth 26a formed along the outer circumference thereof for engaging the connecting gear 27, and has ratchet teeth 26b formed at the central part thereof close to the torsion bar (close to the spool 4). Accordingly, the second limiter gear 26 is always urged in a direction so as to come closer to the first limiter gear 25 by a limiter spring 29 placed between a casing 13a of the motor-driving unit 13 and the second limiter gear 26.

With this structure, in a normal condition where a load torque transmitted to the second limiter gear 26 in the belt-withdrawing direction is less than a predetermined value according to a set load of the limiter spring 29, both ratchet teeth 25b and 26b engage with each other as shown in FIG. 8(b), and the power of the motor 12 indicated by the arrow in the figure is transmitted to the first limiter gear 25 and then to the second limiter gear 26. In this state, although the ratchet teeth 26b receive an axial force so as to come off the ratchet teeth 25b, since the load torque is smaller than the set value, the limiter spring 29 does not contract, so that both ratchet teeth 25b and 26b are held in engagement with reach other.

When the foregoing load torque is greater than the set value, the ratchet teeth 25b slide on a slope of the ratchet teeth 26b and rotate relative to the ratchet teeth 26b as shown in FIG. 8(c). With the rotation of the ratchet teeth 25b relative to the ratchet teeth 26b, the second limiter gear 26 moves axially in the rightward direction so as to come off the first limiter gear 25 while contracting the limiter spring 29. Accordingly, both ratchet teeth 25b and 26b are disengaged from each other, and the second limiter gear 26 does not receive the load torque greater than the set value. With this structure, the load torque exerted on the electric motor 12 is limited to a value smaller than the set value, thereby being protected from an excessive load torque. As described above, the torque limiter mechanism according to the present invention is formed of the clutch formed of the ratchet teeth 25b and 26b and the limiter spring 29.

Next, an operation of the seatbelt retractor 1 will be described. When the seatbelt 3 is not used, the seatbelt 3 is completely retracted with an urging force of the spring unit 11. The electric motor 12 stops, and with the spring force of the limiter spring 29 the ratchet teeth 26b of the second limiter gear 26 are located at a position to engage the ratchet teeth 25b of the first limiter gear 25.

When the seatbelt 3 is withdrawn at a normal speed in use, the spool 4 rotates in the seatbelt-withdrawing direction, so that the seatbelt 3 is fully withdrawn. After a tongue (not shown) slidably attached to the seatbelt 3 is inserted into and latched together with a buckle (not shown) fixed to a car body, an excessively withdrawn portion of the seatbelt 3 is retracted on the spool 4 with an urging force of the spring unit 11, so that a passenger wears the seatbelt 3 without feeling pressure. When the tongue is inserted into and latched together with the buckle, a buckle switch (not shown) is turned on, thereby resulting in a state that the electric motor 12 is ready to be driven.

At an early stage of the emergency, since the seatbelt-retracting torque generated by the pretensioner 8 is transmitted to the spool 4, the spool 4 retracts the seatbelt 3 by a predetermined amount so as to uickly constrain the passenger. A large car-deceleration in case of emergency causes the deceleration-sensing means 5 to be activated, so that the locking mechanism 6 is activated as described above. The activation of the deceleration-sensing means 5 prevents the locking gear 14 from rotating in the seatbelt-withdrawing direction and allows the pawl 16 of the locking mechanism 6 to engage internal teeth 30 formed on a sidewall of the frame 2.

Accordingly, the locking base 17 is prevented from rotating in the seatbelt-withdrawing direction. Since the seatbelt 3 receives a withdrawing force due to inertia of the passenger, the spool 4 rotates in the belt-withdrawing direction and the torsion bar 7 is twisted. As a result, only the spool 4 rotates in the seatbelt-withdrawing direction relative to the locking base 17. Since the motor-driving unit 13 is disposed close to the locking mechanism 6 of the torsion bar 7, the spool 4 rotates without receiving a resistance from the motor-driving unit 13. Accordingly, the shock energy is easily transmitted to the torsion bar 7. Since the spool 4 rotates in the seatbelt-withdrawing direction while twisting the torsion bar 7, the shock energy exerted on a passenger is absorbed and lessened through the torsional torque of the torsion bar 7, and the load exerted on the seatbelt 3 is accordingly limited.

When the spool 4 rotates in the belt-withdrawing direction relative to the locking base 17, the relative-rotation locking member 19 moves axially in the rightward direction in FIGS. 8(b) and 8(c). When the relative-rotation locking member 19 reaches an end of the male thread of the locking base 17, the relative-rotation locking member 19 does not move further axially in the rightward direction, and the rotation thereof is locked. Accordingly, the relative-rotation locking member 19 does not rotate relative to the locking base 17. Alternatively, it can be arranged such that when the relative-rotation locking member 19 contacts a side surface of the flange portion 17c of the locking base 17, the relative-rotation locking member 19 is prevented from moving axially further in the rightward direction. As a result, the spool 4 is also prevented from rotating relative to the locking base 17. That is, the rotation of the spool 4 in the belt-withdrawing direction is locked, and the seatbelt 3 is prevented from being withdrawn, so that the seatbelt 3 prevents the inertia movement of the passenger for protection.

In the seatbelt retractor 1 according to the embodiment, when the seatbelt is withdrawn abruptly, an inertia member 31 (shown in FIGS. 1 and 3) is activated so that the locking base 17 of the locking mechanism 6 rotates in the belt-withdrawing direction relative to the locking gear 14. Since the inertia member 31 is conventionally known, a detailed description thereof is omitted. With this structure, the pawl 16 of the locking mechanism 6 engages the internal teeth 30 formed on the sidewall of the frame 2 as described above and the locking base 17 is prevented from rotating, so that the spool 4 is prevented from rotating in the withdrawing direction by the torsion bar 7 and the seatbelt is prevented from being withdrawn.

In a normal condition, when the electric motor 12 is driven in a direction corresponding to the belt-retracting direction of the spool 4 in order to control the belt tension of the seatbelt 3, the rotating force thereof is transmitted to the spool 4 through the motor gear 22, the first and second idle gears 23 and 24, the first and second limiter gears 25 and 26, the connecting gear 27, the pinion gear 28, the locking base 17, the torsion bar 7, and the bushing 20. Accordingly, the spool 4 rotates in the belt-retracting direction. With this structure, the seatbelt 3 is retracted, and the belt tension increases.

When the electric motor 12 is driven in reverse in a direction corresponding to the belt-withdrawing direction of the spool 4, the rotating force thereof is transmitted to the spool 4, and the spool 4 rotates in the belt-withdrawing direction. Accordingly, the seatbelt 3 is withdrawn, and the belt tension decreases.

When the seatbelt 3 is retracted by the electric motor 12, if a large load torque is exerted on the second limiter gear 26 due to a cause occurring on a side of the spool 4 from the second limiter gear 26, such as the belt tension of the seatbelt 3 due to deceleration in a light car crash in which the locking mechanism 6 as an ELR mechanism is not locked, the power of the electric motor 12 is transmitted, thereby increasing the load torque of the first limiter gear 25 and the load of the electric motor 12 both for rotating the second limiter gear 26. However, when the load torques of the first and second limiter gears 25 and 26 become greater than the set values, both ratchet teeth 25b and 26b are disengaged from each other and the clutch is turned off as shown in FIG. 8(c), thereby shutting off the power transmission. Accordingly, a load torque greater than the set value is not exerted on each component of the power transmission mechanism 21, and the load torque exerted on the electric motor 12 is limited under the set value, whereby protecting the electric motor 12 from an excessive load torque.

According to the seatbelt retractor 1 having the structure as described above, the motor-driving unit 13, i.e. the electric motor 12 and the power transmission mechanism 21, is disposed adjacent to the locking mechanism 6 of the torsion bar 7. Accordingly, the spool 4 is rotatable without receiving a resistance from the motor-driving unit 13. As a result, the shock energy can be easily transmitted to the torsion bar 7, so that the torsion bar 7 is effectively deformed. With this structure, the shock energy exerted on the passenger is effectively absorbed and lessened.

Also, since the motor-driving unit 13 is disposed adjacent to the locking mechanism 6 of the torsion bar 7, it is easy to make a change in a layout and a design feature of the retractor including a conventional retractor in which the motor-driving unit 13 is disposed adjacent to the spool 4 of the torsion bar 7. In addition, the EA mechanism is formed of the torsion bar 7, thereby making the structure of the EA mechanism simple.

Furthermore, since the torque limiter mechanism is disposed, when the seatbelt 3 is retracted by the electric motor 12, if a large load torque is exerted on the second limiter gear 26 due to a cause occurring on a side of the spool 4 from the second limiter gear 26, such as the belt tension of the seatbelt 3 due to deceleration in a light car crash in which the locking mechanism 6 as an ELR mechanism is not locked, the torque limiter mechanism prevents the large load torque from being exerted on the power transmission mechanism 21. As a result, components such as the gears of the power transmission mechanism 21 are not required to have high strengths. In addition, the load torque exerted on the electric motor 12 can be limited, thereby protecting the electric motor 12 from an excessive load torque.

The torque limiter mechanism is formed of the clutch having the ratchet teeth 25b disposed close to the motor, the ratchet teeth 26b disposed close to the spool, and the limiter spring 29, thereby making the structure of the torque limiter mechanism simple.

In the embodiments, the torsion bar 7 is used as the EA mechanism. In place of the torsion bar 7, another known EA mechanism, in which, for example, an energy-absorbing member is broken or deformed or a belt-like energy-absorbing member is squeezed, can be used. A combination of the torsion bar 7 and the known EA mechanism can be used.

In the embodiments, the pretensioner 8 and the relative-rotation locking member 19 are disposed, and these components are not always needed and may be omitted. Also, the power of the electric motor 12 is transmitted to the locking base 17 through the connecting gear 27 and the pinion gear 28. Alternatively, the power of the electric motor 12 may be transmitted to the locking base 17 without passing through the gears 27 and 28, depending on the structure of the retractor 1. In such a case, the connecting gear 27 and the pinion gear 28 may be omitted.

In addition, the torque limiter mechanism formed of the first limiter gear 25, the second limiter gear 26, and the limiter spring 29 is not always needed and may be omitted. However, in order to prevent an excessive load from exerting on the electric motor 12 and the power transmission mechanism 21, the torque limiter mechanism is preferably provided.

The seatbelt retractor of the present invention is applicable to a seatbelt device installed in a seat of a vehicle such as an automobile for restraining and protecting an occupant.

Figure 9:
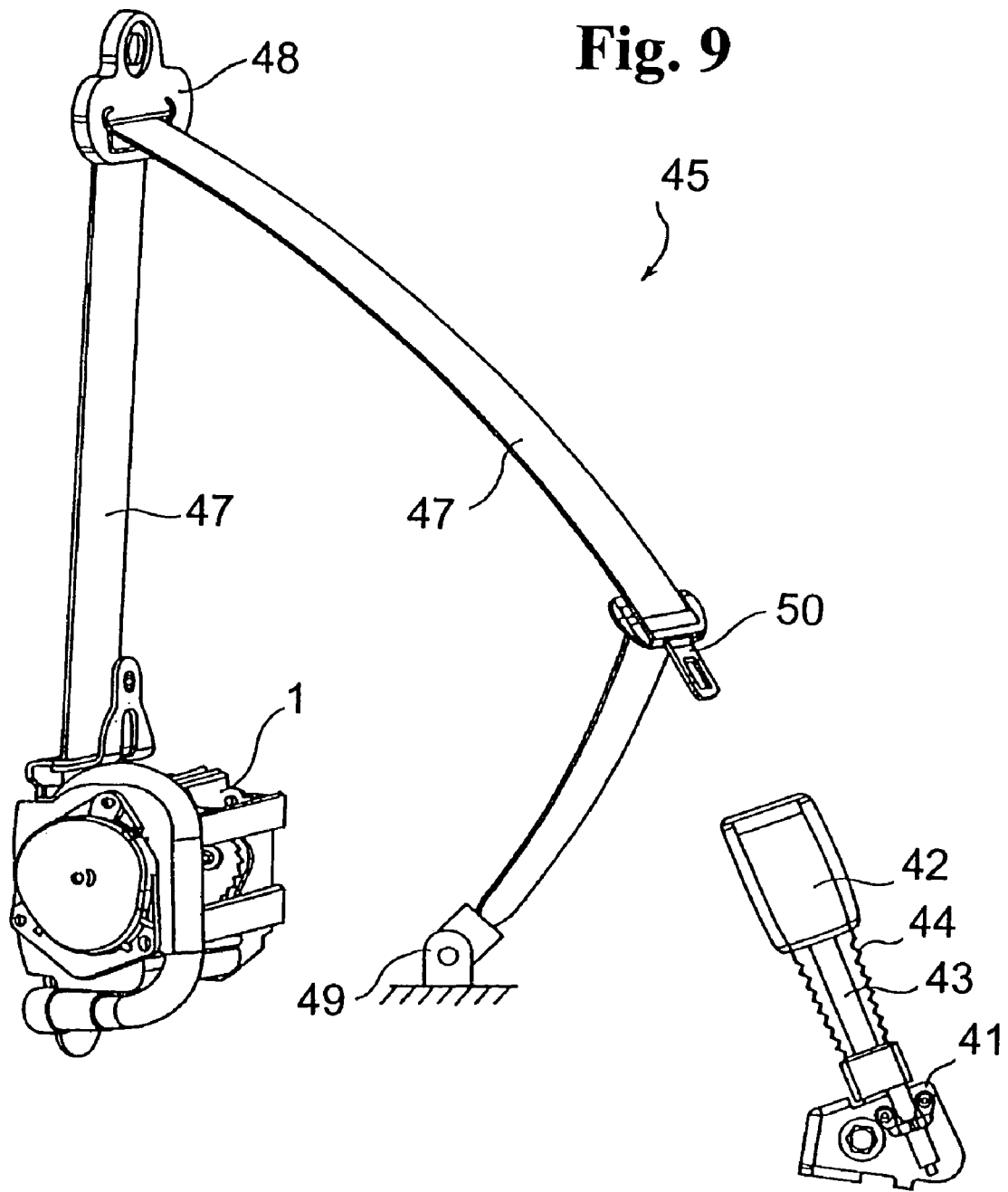
FIG. 9 is a view showing a seatbelt device provided with the seatbelt retractor shown in FIG. 1.

FIG. 9 is a view showing a seatbelt device provided with the seatbelt retractor 1 shown in FIG. 1. As shown in FIG. 9, a seatbelt device 45 includes the seatbelt retractor 1 fixed to a portion of a vehicle body such as a vehicle floor and the like; a belt guide 48 attached to a portion of the vehicle body such as a center pillar and the like for guiding a seatbelt 47 extending from the seatbelt retractor 1 into a predetermined position relative to an occupant; an anchor 49 fixed to a portion of the vehicle body such as a floor and the like on an outer side of a vehicle seat and to which an end of the seatbelt 47 is connected; a tongue 50 slidably supported to the seatbelt 47; a buckle 42 fixed to a portion of the vehicle body such as a floor and the like on an inner side of the vehicle seat and to which the tongue 50 can be latched; a buckle supporting member 41 for supporting the buckle 42; a connecting member 43 connecting the buckle supporting member 41 and the buckle 42; and a boot 44 disposed between the buckle 42 and the buckle supporting member 41.

While the invention has been explained with reference to the specific embodiments of the invention, the explanation is illustrative and the invention is limited only by the appended claims.

What is claimed is:

1. A seatbelt retractor comprising:
   a spool for winding a seatbelt,
   a locking mechanism connected to the spool and having a locking member rotatable together with the spool in a normal condition and being prevented from rotating in a seatbelt-withdrawing direction in an emergency condition,
   an energy-absorbing mechanism interposed between the spool and the locking member for absorbing shock energy exerted on the seatbelt through a passenger when the spool rotates in the seatbelt-withdrawing direction relative to the locking member in the emergency condition,
   a motor for generating power to rotate the spool, and
   a power transmission mechanism connected to the locking mechanism for transmitting the power of the motor to the spool through the power transmission mechanism, the locking member, and the energy-absorbing mechanism.

2. A seatbelt retractor according to claim 1, wherein said energy-absorbing mechanism includes a torsion bar connecting the spool and the locking member and being deformed when the spool rotates relative to the locking member.

3. A seatbelt retractor according to claim 2, wherein said torsion bar is connected at one end to the locking member and at the other end to the spool, said locking member and torsion bar being rotatably attached to a frame of the retractor.

4. A seatbelt retractor according to claim 3, wherein said power transmission mechanism is engaged with the locking member and includes a torque limiter mechanism for preventing a load torque greater than a predetermined value from being transmitted to the motor.

5. A seatbelt retractor according to claim 1, wherein said power transmission mechanism includes a torque limiter mechanism for preventing a load torque greater than a predetermined value from being transmitted to the motor.

6. A seatbelt retractor according to claim 5, wherein said torque limiter mechanism includes a clutch for shutting off the power transmitted to the power transmission mechanism when the load torque exceeds the predetermined value.

7. A seatbelt device comprising the seatbelt retractor according to claim 1, the seatbelt, a tongue for passing the seatbelt, and a buckle for engaging the tongue.

8. A seatbelt retractor comprising:
   a spool for winding a seatbelt,
   a locking mechanism connected to the spool and having a locking member rotatable together with the spool in a normal condition and being prevented from rotating in a seatbelt-withdrawing direction in an emergency condition,
   an energy-absorbing mechanism interposed between the spool and the locking member for absorbing shock energy exerted on the seatbelt through a passenger when the spool rotates in the seatbelt-withdrawing direction relative to the locking member in the emergency condition,
   a motor for generating power to rotate the spool, and
   a power transmission mechanism connected to the locking mechanism for transmitting the power of the motor to the spool through the power transmission mechanism, the locking member, and the energy-absorbing mechanism,
   wherein said power transmission mechanism includes a torque limiter mechanism for preventing a load torque greater than a predetermined value from being transmitted to the motor, said torque limiter mechanism having a clutch for shutting off the power transmitted to the power transmission mechanism when the load torque exceeds the predetermined value,
   wherein said clutch includes first and second limiter gears with ratchet teeth, and a spring for urging the ratchet teeth of the first and second limiter gears to engage together so that when the load torque exceeding the predetermined value is applied to the first limiter gear, the first limiter gear slips relative to the second limiter gear.

9. A seatbelt device comprising the seatbelt retractor according to claim 8, the seatbelt, a tongue for passing the seatbelt, and a buckle for engaging the tongue.

* * * * *